United States Patent Office

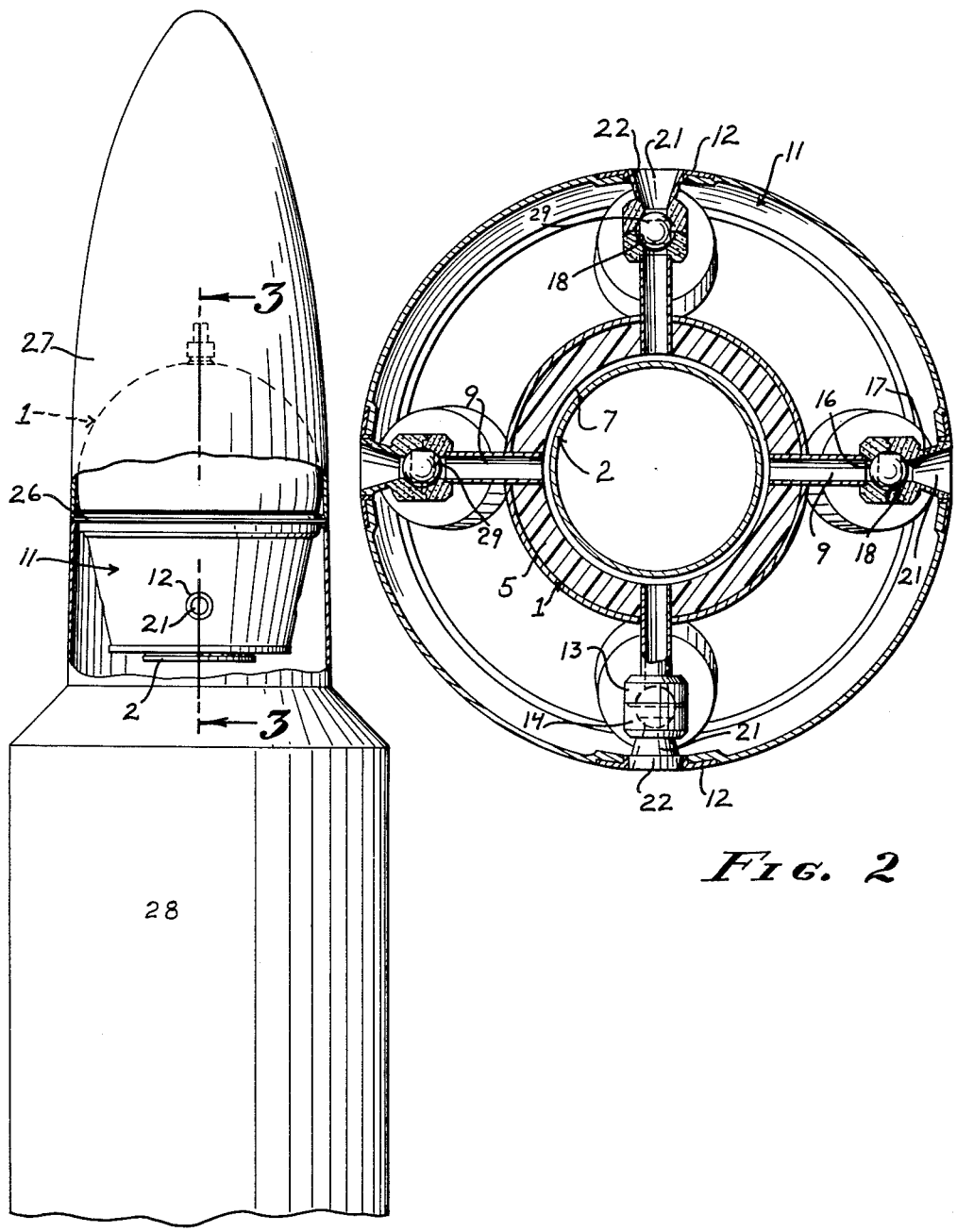

3,139,725
Patented July 7, 1964

1

3,139,725
STEERABLE SOLID PROPELLANT ROCKET
MOTOR
James E. Webb, Administrator of the National Aeronautics and Space Administration, with respect to an invention of Carl W. Raggio, Jr.
Filed Oct. 31, 1961, Ser. No. 180,382
9 Claims. (Cl. 60—35.54)

This invention relates to steerable solid propellant rocket motors and included in the objects of this invention are:

First, to provide a steerable solid propellant rocket motor which is provided with laterally directed steering nozzles connected with the rocket motor chamber, and provided with valve means arranged for remote control so that laterally directed thrusts of selected duration may be made during operation of the rocket motor to guide the rocket motor and vehicle attached thereto.

Second, to provide a steerable solid propellant rocket motor wherein the steering nozzles are provided with novel valve means adapted to withstand the heat generated by the combustion products of the solid propellant.

Third, to provide a steerable solid propellant rocket motor having a propellant chamber of essentially spherical form and provided with a main nozzle extending partly into the propellant chamber, and four equally spaced laterally directed steering nozzles clustered around the outwardly projecting portion of the main nozzle and connected with the propellant chamber by ducts terminating adjacent the main nozzle, the solid propellant being cast in the propellant chamber so as to clear the portion of the main nozzle therein and expose the entrance ends of the ducts so that pressure for steering control is available the instant pressure develops in the propellant chamber.

Fourth, to provide a steerable rocket motor which is particularly adapted for use as the final stage or intermediate stage of a multiple stage rocket to effect orientation of the rocket payload, or as a retro-rocket to reduce velocity of the rocket vehicle.

With the above and other objects in view as will appear hereinafter, reference is directed to the accompanying drawings in which:

FIGURE 1 is a reduced fragmentary view of a multiple stage rocket motor showing the steerable rocket motor forming a part of the final stage.

FIGURE 2 is an enlarged fragmentary sectional view of the steerable rocket motor taken substantially through 2—2 of FIGURE 3.

Figure 3:
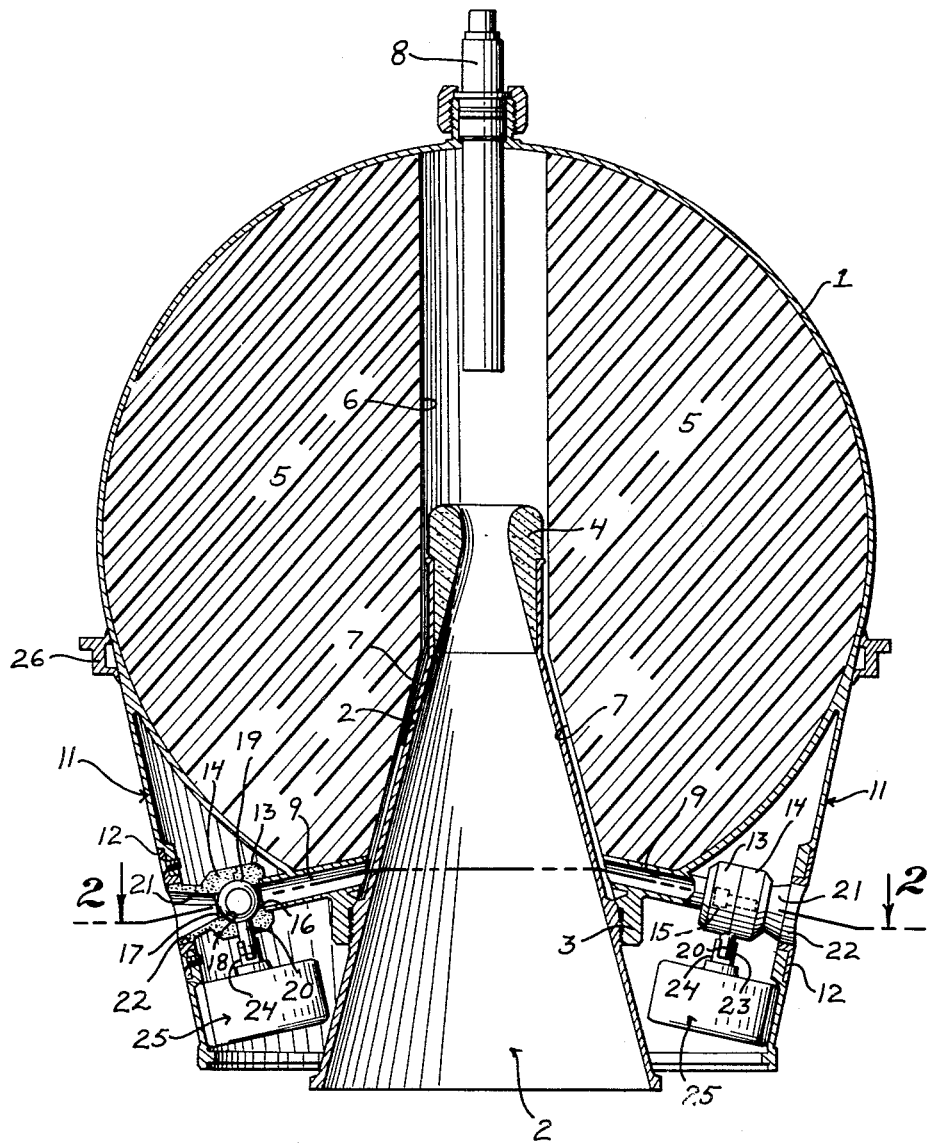
FIGURE 3 is a longitudinal sectional view of the steerable rocket motor with the remaining portions of the final stage unit omitted.

The steerable rocket motor includes a propellant chamber body 1, which is illustrated as being spherical in form. The propellant chamber body is provided with a relatively large opening adapted to receive a main nozzle 2. The nozzle receiving opening is provided with an internally screw-threaded lip 3 which mates with a screw-threaded portion formed externally of the main nozzle 2.

The main nozzle is in the form of a cone frustum with its smaller end directed into the chamber body and provided with a throat 4. The main nozzle is formed of metal whereas the throat is formed of graphite.

The propellant chamber body is filled with a solid propellant charge 5 which has a central bore 6 coaxial with the main nozzle 2. That portion of the bore 6 which surrounds the nozzle 2 is spaced from and in parallelism with the walls of the nozzle to form an annular flow passage 7. Extending into the propellant charge bore 6 from the end thereof opposite from the main nozzle 2 is a standard igniter 8.

Adjacent the main nozzle supporting lip 3 the propellant chamber body 1 is provided with four laterally directed diverter ducts 9. The radially inner ends of these ducts project into the propellant charge 5 and terminate at the wall of the bore 6 so as to communicate with the flow passage 7.

Secured to the propellant chamber body 1 is an annular skirt 11 which is in the form of a cone fustrum. The skirt is concentric with the main nozzle 2 and its walls converge from the propellant chamber body 1. Mounted in the walls of the skirt 11 in coaxial relation with the diverter ducts 9 are a set of four guide rings 12.

Mounted at the outer end of each diverter duct is a pair of complementary valve body members 13 and 14 which are joined together by bolts 15, and which are formed of heat-conducting, nonmetallic material. Each body member 13 is provided with an inlet port 16 whereas each body member 14 is provided with a coaxial outlet port 17. The two body members form therebetween a valve chamber 18 which is spherical to receive a ball valve element 19 having a stem 20 and a bore or passageway 29 to permit the flow of propellant gases therethrough when the valve element is in its open position.

Each valve body member 14 is provided with an integral steering nozzle 21 which diverges outwardly from the outlet port 17. The outer or discharge end of each steering nozzle extends into a corresponding guide ring 12 and externally is provided with a guide flange 22 which fits slidably within the guide ring 12 to permit thermal expansion of the nozzles.

The stem 20 of each ball valve element 19 is connected by a coupling 23 to an armature 24 of a rotary solenoid 25 contained in a housing which is secured to the skirt 11. The rotary solenoid is conventional and is the type which when energized turns 90°. Each ball valve is arranged to turn from its closed to its open position and from its open position to its closed position by a 90° rotation. Consequently, the rotary solenoid turns the corresponding valve element alternately between a closed and an open position.

The propellant chamber body is provided with a suitable mounting ring 26 for attachment to the other portions of a final rocket stage 27 indicated diagrammatically in FIGURE 1. This rocket stage is connected in a conventional manner to a preceding rocket stage 28 and means not shown are employed to separate these stages in response to remote command or other signal.

Operation of the steerable solid propellant rocket motor is as follows:

Upon ignition of the solid propellant charge 5 pressure rapidly builds up in the bore 6 of the propellant charge as the charge burns. The products of combustion discharge principally from the main nozzle 2. However, the ducts 9 are exposed to the pressures generated within the propellant chamber body through the flow passage 7.

Four steering nozzles 21 are provided arranged 90° to each other. By momentarily opening the various associated valves lateral thrusts are applied to the rocket motor to change its course. The rotary solenoids may be operated by remote command or may be operated by control devices carried by the rocket; for example, sensors which determine the course of the rocket motor and then operate the solenoids to open the steering nozzles for precise periods until the rocket motor is on course.

The control afforded by the steering nozzles 21 and the rotary solenoids 25 are particularly adapted to permit use of the rocket motor as a retro rocket, that is, the steering nozzles may serve to cause the rocket motor to turn 180° transverse to the axis of the main nozzle so that the thrust of the main nozzle may exert a retarding force to reduce the velocity of the rocket motor.

While what hereinbefore has been described as the preferred embodiment of this invention, it is readily apparent that alterations and modifications may be resorted to without departing from the scope of this invention and such alterations and modificaitons are intended to be included within the scope of the appended claims.

I claim:

1. A steerable solid propellant rocket motor, comprising: a propellant chamber body of essentially spherical shape; a frusto conical skirt converging therefrom; a main nozzle diverging from said chamber within said skirt, said main nozzle having an inner portion extending into said body; a solid propellant charge initially filling said body and having a central bore receiving the inner portion of said main nozzle and spaced therefrom; a set of diverter ducts extending laterally from said body to said skirt and communicating with the bore of said propellant charge; steering nozzles at the extremities of said diverter ducts having discharge ends penetrating the exterior surface of said skirt; valve means interposed in said ducts; and means for operating said valve means to effect selective operation of said steering nozzles.

2. A steerable solid propellant rocket motor, comprising: a propellant chamber body of essentially spherical shape; a frusto conical skirt converging therefrom; a main nozzle diverging from said chamber within said skirt, said main nozzle having an inner portion extending into said body; a solid propellant charge initially filling said body and having a central bore receiving the inner portion of said main nozzle and spaced therefrom; a set of diverter ducts extending laterally from said body to said skirt and communicating with the bore of said propellant charge; guide rings set in said skirt in coaxial relation with said ducts; steering nozzles having discharge ends slidable in said rings; valve means interposed between said steering nozzles and said ducts; and means for operating said valve means to effect selective operation of said steering nozzles.

3. A steerable solid propellant rocket motor, comprising: a propellant chamber body of essentially spherical shape; a frusto conical skirt converging therefrom; a main nozzle diverging from said chamber within said skirt, said main nozzle having an inner portion extending into said body; a solid propellant charge initially filling said body and having a central bore receiving the inner portion of said main nozzle and spaced therefrom; a set of diverter ducts extending laterally from said body to said skirt and communicating with the bore of said propellant charge; a combination steering nozzle and valve means at the laterally outer end of each duct, each of said means including a valve body formed of a heat resisting non-metallic material defining a coaxial inlet, an outlet, and a valve chamber therebetween, said outlet having diverging walls forming said steering nozzle, and a rotary valve element journaled in said valve chamber; a guide ring for each steering nozzle set in said skirt to permit limiting sliding movement of said steering nozzle as said nozzle changes in temperature; and means for operating said valve means to effect selective operation of said steering nozzles.

4. A steerable solid propellant rocket motor, comprising:
    (a) a propellant chamber body having a main nozzle opening and a set of radiating diverter ducts adjacent said opening;
    (b) a main nozzle sealed in said opening and converging therefrom into said propellant chamber body and having a nozzle entrance at its inner end;
    (c) a solid propellant within said propellant chamber body and surrounding said main nozzle, said propellant having a central bore coaxial with said main nozzle, and forming an annular passage externally of said main nozzle leading to said diverter ducts;
    (d) steering nozzles at the radially outer extremities of said diverter ducts;
    (e) and remotely actuated valve means interposed in said diverter ducts.

5. A steerable solid propellant rocket motor, comprising:
    (a) a propellant chamber body having a main nozzle opening and a set of radiating diverter ducts adjacent said opening;
    (b) a main nozzle sealed in said opening and converging therefrom into said propellant chamber body and having a nozzle entrance at its inner end;
    (c) a solid propellant within said propellant chamber body and surrounding said main nozzle, said propellant having a central bore coaxial with said main nozzle, and forming an annular passage externally of said main nozzle leading to said diverter ducts;
    (d) a valve body having an integral steering nozzle disposed at the radially outer end of each diverter duct;
    (e) a valve in each valve body;
    (f) and a rotary solenoid means for turning each valve.

6. A steerable solid propellant rocket motor, comprising:
    (a) a propellant chamber body having a main nozzle opening and a set of radiating diverter ducts adjacent said opening;
    (b) a main nozzle sealed in said opening and converging therefrom into said propellant chamber body and having a nozzle entrance at its inner end;
    (c) a solid propellant within said propellant chamber body and surrounding said main nozzle, said propellant having a central bore coaxial with said main nozzle, and forming an annular passage externally of said main nozzle leading to said diverter ducts;
    (d) a valve body having an integral steering nozzle disposed at the radially outer end of each diverter duct;
    (e) guide means supported from said propellant chamber body surrounding the radially outer ends of said steering nozzles to permit radial thermal expansion of said steering nozzles;
    (f) a valve in each valve body;
    (g) and a rotary solenoid means for turning each valve.

7. A steerable solid propellant rocket motor, comprising:
    (a) a spherical propellant chamber body having a main nozzle opening and a set of radiating diverter ducts adjacent said opening;
    (b) a conical main nozzle sealed in said opening and having an entrance end at the center of said propellant chamber body;
    (c) a solid propellant within said propellant chamber body and surrounding said main nozzle, said propellant having a central bore coaxial with said main nozzle, and forming an annular passage externally of said main nozzle leading to said diverter ducts;
    (d) steering nozzles at the radially outer extremities of said diverter ducts;
    (e) and remotely actuated valve means interposed in said diverter ducts.

8. A steerable solid propellant rocket motor, comprising:
    (a) a spherical propellant chamber body having a main nozzle opening and a set of radiating diverter ducts adjacent said opening;
    (b) a conical main nozzle sealed in said opening and having an entrance end at the center of said propellant chamber body;
    (c) a solid propellant within said propellant chamber body and surrounding said main nozzle, said propellant having a central bore coaxial with said main nozzle, and forming an annular passage externally of said main nozzle leading to said diverter ducts;
    (d) a valve body having an integral steering nozzle disposed at the radially outer end of each diverter duct;

(e) a valve in each valve body;
(f) and a rotary solenoid means for turning each valve.

9. A steerable solid propellant rocket motor, comprising:
   (a) a spherical propellant chamber body having a main nozzle opening and a set of radiating diverter ducts adjacent said opening;
   (b) a conical main nozzle sealed in said opening and having an entrance end at the center of said propellant chamber body;
   (c) a solid propellant within said propellant chamber body and surrounding said main nozzle, said propellant having a central bore coaxial with said main nozzle, and forming an annular passage externally of said main nozzle leading to said diverter ducts;
   (d) a valve body having an integral steering nozzle disposed at the radially outer end of each diverter duct;
   (e) guide means supported from said propellant chamber body surrounding the radially outer ends of said steering nozzles to permit radial thermal expansion of said steering nozzles;
   (f) a valve in each valve body;
   (g) and a rotary solenoid means for turning each valve.

References Cited in the file of this patent

UNITED STATES PATENTS

| | | |
|---|---|---|
| 3,015,210 | Williamson et al. | Jan. 2, 1962 |
| 3,024,596 | Hatfield | Mar. 13, 1962 |
| 3,045,596 | Rae | July 24, 1962 |

FOREIGN PATENTS

| | | |
|---|---|---|
| 1,087,909 | Germany | Aug. 25, 1960 |